April 23, 1940.
D. CANADY
2,198,403
FILM SPEED EQUALIZER
Filed Oct. 14, 1939
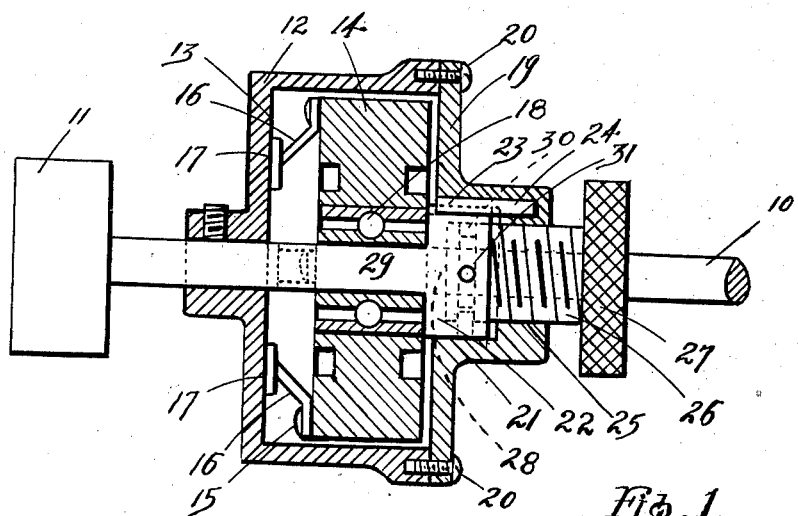
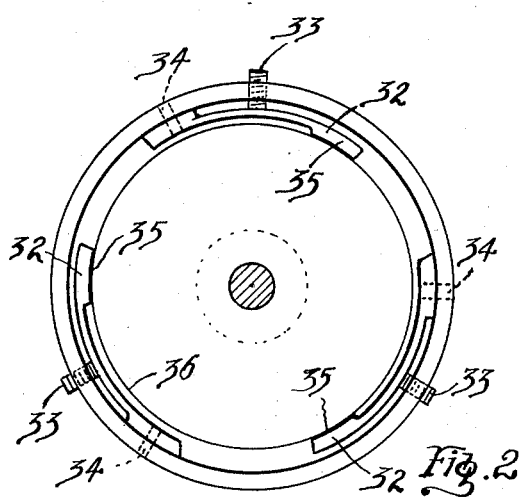
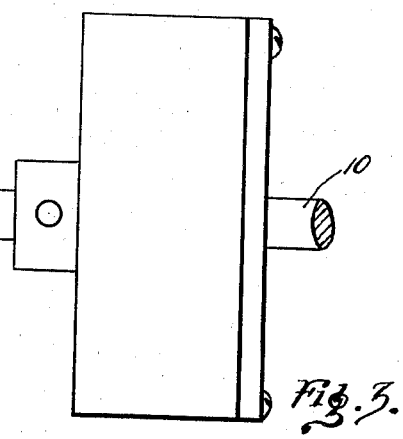
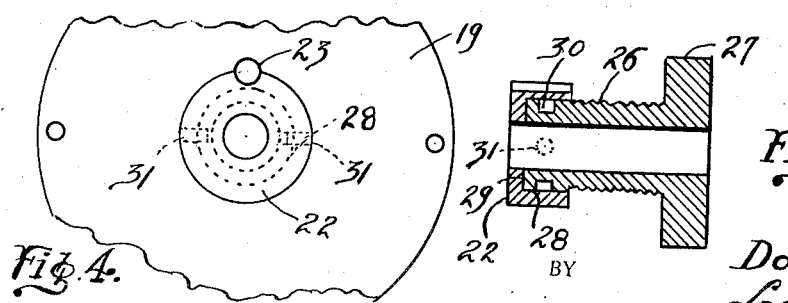
INVENTOR.
Don Canady
BY Lawler + Lawler
ATTORNEYS.

Patented Apr. 23, 1940

2,198,403

UNITED STATES PATENT OFFICE 2,198,403

FILM SPEED EQUALIZER

Don Canady, Cleveland, Ohio

Application October 14, 1939, Serial No. 299,534

1 Claim. (Cl. 74—574)

In recording and reproducing sound on a film it is very essential that the film strip travel at a constant speed around the scanning drum. It has been found that the classic fly-wheel mounted on the same shaft with the scanning drum is not capable of maintaining a constant speed due to "hunting" of the fly-wheel. A film splice passing around the scanning drum will set up a disturbance causing the fly-wheel to "hunt" or oscillate for a period of time depending somewhat upon the mass of the fly-wheel.

A prominent object of my invention is to provide means to compensate for variations in the motion of the film arising from irregularities in the film, as well as to equalize small irregularities in motion caused by the driving mechanism that might be transmitted to the scanning drum thereby interrupting its constant speed.

Another object of the invention is to provide a simple, efficient and dependable apparatus for the above purposes.

With the foregoing and other objects in view, which will appear as the description proceeds, the invention resides in the combination and arrangement of parts and details of construction hereinafter described and claimed, it being understood that changes in the precise embodiment of the invention herein disclosed can be made within the scope of what is claimed without departing from the spirit of the invention.

Similar reference numerals indicate corresponding parts throughout the drawing.

Referring to Figure 1, which illustrates one way of carrying out the invention, one form of a film speed equalizer is shown in axial section.

Figure 2 is a front view of a modified form, the cover plate is removed to show the interior construction.

Figure 3 is a side view of Figure 2 showing the same enclosed.

Figure 4 is a fragmentary view of the cover plate shown in Figure 1. The means for preventing rotational movement of the member on the end of the pressure adjusting means is shown at 23.

Figure 5 is a central vertical section of the pressure adjusting means removed from the cover plate.

In the construction shown in the drawing, there is mounted on and rigidly attached on the driven shaft 10 a scanning drum 11. Rigidly attached on the driven shaft there is also mounted a casing 12 having a friction surface 13 therein. In the casing there is provided a fly-wheel 14 freely mounted on the driven shaft. On the face 15 of the fly-wheel there is provided a plurality of fixed resilient members 16, extending outwardly from the fly-wheel face, each having connected thereto in a suitable manner a shoe 17 provided with matter which can well withstand friction, which frictionally engages the friction surface in the casing. The fly-wheel is provided with a ball bearing 18. The casing is closed by a cover plate 19, held in position by means of screws 20 or otherwise.

In the cover plate there is provided a smooth bore 21 in which the end member 22 of the pressure adjusting device slidably and snugly fits. The end member can move axially in the bore, while it is prevented from moving rotationally therein by the pin 23 fast in the cover plate as at 24. The pin prevents the end member from moving rotationally in relation to the cover plate, and hence in relation to the shaft.

Above the smooth bore 21 there is provided a threaded bore 25 for the reception of the threaded adjusting means 26, which is provided with a knurled head 27. The end member is provided with a seat 28 for the reception of the end 29 of the adjusting screw, which is provided with an annular groove 30 for the reception of pins 31, 31, 31, that hold the end member in assembled relation with the adjusting screw. It will be noted that pressure on the friction instrumentalities may be increased or diminished by screwing and unscrewing the adjusting screw in the cover plate.

In the form shown in Figure 2, the pressure on the resilient means 32 is accomplished by means of the set screws 33, 33, 33.

The resilient means are fixed to the casing as at 34, 34, and 34. The shoes 35, 35, and 35 on the resilient means frictionally engage the periphery of the fly-wheel 36.

Obviously a fixed friction plate may be used instead of the casing shown in Figure 1, and a collar with a set screw on the shaft may be used to vary the frictional engagement of the resilient members with the plate.

It is believed that the operation of the apparatus as a whole will be clear, in view of the foregoing description which has been given in connection with the construction of the same.

It is to be understood that the present invention may be embodied in other specific forms without departing from the spirit or essential attributes of said invention, and I therefore desire that the present embodiment be considered in all respects as illustrative and not restrictive, reference being had to the appended claim rather than the foregoing description to indicate the scope of the invention.

Having thus described my invention, I claim:

A film speed equalizer comprising a driven shaft, a scanning drum fast thereon, a casing fast on the driven shaft having a friction surface therein, a fly-wheel rotatively mounted in the casing, spaced resilient frictionally-engaging members attached to the fly-wheel and interposed between the opposed surfaces of the fly-wheel and the friction surface in the casing, a removably mounted cover on the casing having a threaded central bore which communicates with a cavity in the cover, an externally threaded adjusting member having a through smooth bore mounted on the driven shaft and snugly engaging the same, the external thread on the adjusting member threadedly engaging the threaded bore in the cover, a non-rotatable axially shiftable means mounted in the cavity in the cover and cooperating with the threaded adjusting member, said adjusting member and non-rotatable axially shiftable means adapted to vary frictional contact of the frictionally-engaging members with the friction surface in the casing through the manual manipulation of the threaded adjusting member on the driven shaft.

DON CANADY.